3,706,725
Patented Dec. 19, 1972

3,706,725
BASIC TRIAZOLE DISAZO DYES
Minoru Ozutsumi, Shigeo Maeda, and Teruo Nakajyo, Tokyo, Japan, assignors to Hodogaya Chemical Industry Co., Limited, Tokyo, Japan
No Drawing. Filed Apr. 15, 1970, Ser. No. 28,933
Claims priority, application Japan, May 20, 1969, 44/38,419
Int. Cl. C09b 35/34; D06p 3/70
U.S. Cl. 260—157                    7 Claims

ABSTRACT OF THE DISCLOSURE

Basic disazo compounds having the formula:

$$\left[\begin{array}{c}R\diagdown N\diagup N\\ \phantom{xx}N\phantom{xx}\\ B-N=N-C\diagdown_{N}\diagup C-N=N-B\\ \phantom{xxxx}|\\ \phantom{xxxx}R\end{array}\right]^{\oplus} Z^{\ominus} \quad (I)$$

or $$\left[\begin{array}{c}R\\ \phantom{x}|\\ R\diagdown N\diagup N\\ \phantom{xx}N\phantom{xx}\\ B-N=N-C\diagdown_{N}\diagup C-N=N-B\end{array}\right]^{\oplus} Z^{\ominus} \quad (I')$$

Wherein R represents a lower alkyl or a benzyl radical; $Z^{\ominus}$ represents an anion; and B represents either $$A-N\diagdown_{R_2}^{R_1} \quad (II)$$

wherein A is a phenylene group or a naphthylene group which may have a lower alkyl, lower alkoxy or an acylamine radical or halogen as a substituent; $R_1$ and $R_2$ each represent, respectively, hydrogen, lower alkyl, oxyalkyl, cyanoalkyl, alkoxyalkyl, halogenoalkyl, or an aralkyl radical, substituted or un-substituted phenyl group, and the $R_1$ and $R_2$ taken together can be bonded to form a ring directly or linked with nitrogen or oxygen atom; or $$\underset{X}{\underset{|}{\bigcirc}}-N-Y \quad (III)$$

wherein X represents a divalent residue radical which can form hetero rings having 5 or 6 members linked with a nitrogen atom; and Y represents a lower alkyl, oxyalkyl, cyanoalkyl, alkoxyalkyl, halogenoalkyl, or an aralkyl radical which are useful for coloring a wide variety of fibers and especially polyacrylonitrile type fibers and methods for producing the same which compounds provide shades of color which are characterized by high fastness to sunlight, good wash resistance, good rub resistance, and good heat stability.

BACKGROUND OF THE INVENTION

This invention relates to a group of novel disazo compounds which are useful for coloring fibers and particularly polyacrylonitrile type fibers. Further, this invention relates to processes for producing said disazo compounds.

It has been known that various types of basic dyes can be produced by quaternizing the corresponding nitrogen containing compound. For example, in U.S. Pat. 3,133,910, there is disclosed a technique for producing basic triazol disazo dyes. In this technique, monoazo dyes are produced at first by coupling 3-amino-1,2,4-triazol, the first disazo component, with a primary amine, the first azo component, and then the obtained monoazo compound is diazotized and coupled with a second azo component and finally the disazo dye is quaternized. In British Pat. 1,117,734, it has been disclosed to form monoazo type basic dyes using 1-phenyl-3,5-diamino-1,2,4-triazol as the diazo component. Heretofore, however, no one has disclosed a disazo type basic dye which uses guanazole (3,5-diamino-1,2,4-triazol) as the starting reactant.

It is an object of this invention, therefore, to provide novel disazo compounds.

Another object of this invention is to provide novel basic disazo dyes which provide shades of color which are characterized by high fastness to sunlight, good wash resistance, good rub resistance, and good heat stability.

A further object of this invention is to provide processes for producing the same.

SUMMARY OF THE INVENTION

In accordance with this invention, the following disazo compounds have been provided:

$$\left[\begin{array}{c}\phantom{xx}N\diagup N\\ R-N\phantom{xx}\\ B-N=N-C\diagdown_{N}\diagup C-N=N-B\\ \phantom{xxxx}|\\ \phantom{xxxx}R\end{array}\right]^{\oplus} Z^{\ominus} \quad (I)$$

or $$\left[\begin{array}{c}R\\ \phantom{x}|\\ \phantom{xx}N\diagup N\\ R-N\phantom{xx}\\ B-N=N-C\diagdown_{N}\diagup C-N=N-B\end{array}\right]^{\oplus} Z^{\ominus} \quad (I')$$

where R is a lower alkyl or a benzyl radical; $Z^{\ominus}$ represents an anion and B represents either $$A-N\diagdown_{R_2}^{R_1} \quad (II)$$

wherein A is a phenylene group or a naphthylene group which can have a lower alkyl, a lower alkoxy, an acylamine radical or a halogen atom as a substituent; $R_1$ and $R_2$ each represents, respectively, hydrogen, lower alkyl, oxyalkyl, cyanoalkyl, alkoxyalkyl, halogenoalkyl, or an aralkyl radical, a substituted or unsubstituted phenyl group, and $R_1$ and $R_2$ taken together can be bonded to form a ring directly or linked with nitrogen or oxygen; or $$\underset{X}{\underset{|}{\bigcirc}}-N-Y \quad (III)$$

wherein X represents a divalent residue radical which can form hetero rings having 5 or 6 members linked with a nitrogen atom; and Y is lower alkyl, oxyalkyl, cyanoalkyl, alkoxyalkyl, halogenoalkyl, or an aralkyl radical.

The basic disazo dyes of this invention are useful for dyeing fibers such as cotton mordanted with tartar emetic and tannin, cellulose acetate, paper, silk, leather, synthetic fibers which have an acidic group as dyesite, especially fibers made of polyacrylonitrile, polyester or copolymers thereof. These dyes can provide various brilliant shades of red which have excellent fastness to sunlight, good wash and rub resistance and good heat stability.

The basic disazo dyes of this invention are provided by quaternizing a disazo dye which is free of sulfonic radicals or carbonic radicals and which is characterized by the general formula:

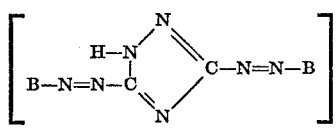

wherein B is as defined above.

The basic disazo dyes having the general formula:

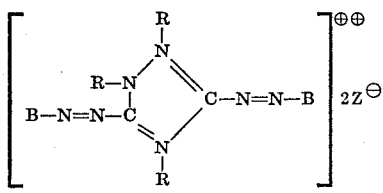

wherein the definitions of R, $Z^{\ominus}$ and B are as defined above can also be produced according to this invention by quaternizing the disazo dye having the Formula IV with an excess amount of a quaternizing agent. Although the basic disazo dye of Formula I is produced as the main product, a mixture of the dyes of Formulas I and I' can also be produced.

The basic disazo dye of this invention can be produced by quaternizing the disazo dye of the Formula IV which is produced by coupling after tetrazotating guanazole. Accordingly, the basic disazo dyes of this invention are quite different in chemical structure from the prior art and moreover, they are characterized by an excellent degree of dyeability, excellent fastness to sunlight, excellent wash and rub resistance and good heat stability in comparison to conventional known basic dyes.

In the process of this invention, disazo dyes of the Formula IV can be produced by coupling the tetrazotated guanazole with benzene type or naphthalene type of amine compound which contains no acid radical capable of being dissociated in water. Suitable amine compounds for coupling can be selected from amines which are known to be useful for producing azo dyes, preferably amines which are coupled to the p position of an amino radical. The amino radical in the group of Formula II can be a primary or a secondary amino radical; however, preferably, it is a tertiary amino radical. Each $R_1$ and $R_2$ which is a substituent of the amino radical can be lower alkyl, such as methyl, ethyl, or butyl radical; a substituted alkyl radical such as an oxyalkyl radical, e.g., beta-oxyethyl radical, cyanoalkyl radical, e.g., beta-cyanoethyl, alkoxyalkyl radical, e.g., beta-methoxyethyl radical or a halogenoalkyl radical, e.g., beta-chloroethyl radical; an aralkyl radical, such as a benzyl radical; substituted or unsubstituted phenyl groups. The pair of R and R' taken together can be bonded to form a ring of piperidino, or piperadino or morpholino compounds, etc. The substituent of Formula III can be tetrahydroquinolyl or indonyl, etc. The amine compound stated above can have a non-ionic substituent as a halogen atom, lower alkyl, acylamine, or an alkoxy radical in addition to the amino radical.

Typical examples of amine compounds used for producing the basic disazo dyes of this invention are N-(β-cyanoethyl)-O-chloroaniline,
N,N-diethylaniline,
N-ethyl-N-(β-methoxyethyl)aniline,
N,N-diethyl-m-toluidine,
N,N-diethyl-m-chloroaniline,
N,N-diethyl-m-anisidine,
N,N-diethyl-N'-acetyl-m-phenylenediamine,
N,N-dimethylaniline,
N,N-di-(n)-butylaniline,
N,N-dibenzylaniline,
N-ethyl-N-benzylaniline,
N-ethyl-N-(β-oxyethyl)aniline,
N-ethyl-N-(β-oxyethyl)-m-toluidine,
N-methyl-N-(β-chloroethyl)aniline,
N-benzyl-N-(β-cyanoethyl)aniline,
N,N-bis-(β-cyanoethyl)aniline,
N,N-bis-(β-cyanoethyl)-m-toluidine,
N,N-bis-(β-chloroethyl)aniline,
N-methyl diphenylamine,
N-ethyl-4-ethoxy diphenylamine,
1,2-dimethylindoline,
1,2,3,4-tetramethyl indoline,
N-phenylpiperadine,
N-phenylmorphorine,
N-phenylpiperidine,
1-methyl-1,2,3,4-tetrahydroquinoline,
1-methyl-3-oxy-1,2,3,4-tetrahydroquinoline,
1-butyl-3-oxy-1,2,3,4-tetrahydroquinoline,
1-methyl-3-methoxy-1,2,3,4-tetrahydroquinoline,
1-methyl-3-chloro-1,2,3,4-tetrahydroquinoline,
1-benzyl-2-methyl indoline,
1-(β-bromoethyl)-2-methylindoline,
1-(β-chloroethyl)-2-methyl indoline,
N,N-dimethyl-α-naphthylamine, and
N,N-diethyl-α-naphthylamine.

In the process for producing the basic disazo dye of this invention, the tetrazotating reaction of guanazole is provided by adding a solution of the guanazol in 60% acetic acid dropwise into nitrosylsulfuric acid at a temperature of −5° to 0° C. The coupling reaction is provided by adding a solution of the azo component in glacial acetic acid into the tetrazonium salt solution of guanazole. The inorganic acid is neutralized with ammonium acetate or sodium acetate. The disazo dye thus produced, is then separated by pouring the solution into water and is then quaternized to produce the basic disazo dyes of Formula IV. For example, the disazo dye may be reacted with an alkylating agent or an aralkylating agent in an inert organic solvent such as benzene, toluene, xylene, chloroform, tetrachloromethane, tetrachloroethane, chlorobenzene, o-dichlorobenzene, dioxane, or dimethyl formamide. Instead of the inert solvent, an excess amount of the alkylating agent or aralkylating agent can be used. Typical alkylating agents and aralkylating agents include the esters of inorganic acids or organic sulfonic acids, alkyl halides, etc., e.g., dimethyl sulfate, diethyl sulfate, methylbenzene sulfonate, methyl or ethyl p-toluene sulfonate, and benzylchloride. Although the reaction is exothermic, it is preferable to heat the reactants to initiate the reaction and thereafter to maintain a high reaction temperature. The quaternary salt dye produced by this reaction can be precipitated in an inert organic solvent, hence, it can easily be separated by filtration. The dyes can alternatively be separated, however, by vacuum or steam distillation to remove the solvent. Where the solvent is compatible with water, the aqueous solution of the dye can be separated by salting out.

The cationic disazo dye of this invention has an anion which is provided by the strong inorganic acid or strong organic acid, e.g., hydrochloric acid, hydrobromic acid, sulfuric acid, benzene sulfonic acid, toluene sulfonic acid, sulfuric acid monoalkyl ester. The cationic disazo dye can be a complex salt such as complex salts of zinc chloride.

The dyes of this invention are basic dyes which are capable of imparting a reddish-blue or a blue shade. They are water-soluble and hence are suitable for dyeing materials which are dyeable with conventional basic dyes such as paper, cotton mordanted with tartar emetic and tannin, cellulose acetate, silk, leather, and synthetic fibers which have acidic groups as dye-sites, especially polyacrylonitrile and polyester type and copolymers thereof. Where the fiber dyed is polyacrylonitrile or acrylonitrile copolymers, excellent dyeing properties are obtained. The fastness of these dyes to sunlight, their excellent wash and rub resistance, and their good heat stability and high affinity for a wide variety of fibers render these dyes quite useful in a variety of applications. Various color shades and brightnesses from deep colors to pale colors can be obtained with these dyes. Another remarkable advantage of these dyes when they are used with acrylonitrile fibers is that they can be completely discolored by using stannous chloride.

Having generally described the invention, a further understanding can be obtained by reference to the following specific examples which are provided herein for purposes of illustration only and are not intended to be limiting in any manner. In these examples, all parts and percentages are intended to be referred to as parts by weight and percent by weight, unless otherwise stated.

EXAMPLE 1

A solution of 9.9 parts of guanazole in 99 parts of 60% acetic acid is added dropwise to a mixture of 298 parts of nitrosyl sulfuric acid and 14.7 parts of sodium nitrite at −5° to 0° C. while stirring. The mixture is stirred for 1 hour in the presence of an excess amount of nitrous acid, to produce the tetrazo compound.

After removing the nitrous acid by addition of a small amount of urea, a solution of 29.8 parts of N,N-diethyl-aniline in 60 parts of glacial acetic acid, is added to the solution of the tetrazonium salt of guanazole at 0° to 2° C. 220 parts of ammonium acetate is then added to the solution over a period of 1 hour to cause coupling.

The coupling mixture is poured into 2,000 parts of ice water and then 226 parts of 48% aqueous solution of sodium hydroxide is added thereto.

The dark reddish-brown precipitate produced is filtered and dried at 70° C. The disazo dyestuff having the following formula is obtained:

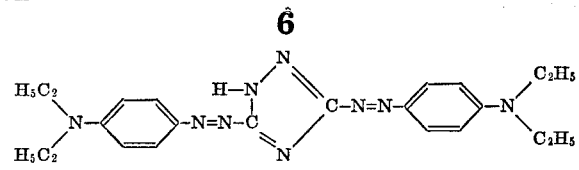

33 parts of this disazo dye is dissolved in 330 parts of dimethyl formamide and then 21.8 parts of dimethyl sulfuric acid is added dropwise at 60° C. The mixture is stirred for 2 hours at 95° C. to effect quaternization.

The product thus obtained by quaternizing is poured into 1,300 parts of water and is filtered with 5 parts of active carbon.

200 parts of sodium chloride is added to the filtrate to cause salting out. The dark blue precipitate is filtered and dried at 70° C. and 52 parts of the quaternary ammonium salt dyestuff having the following formula is obtained:

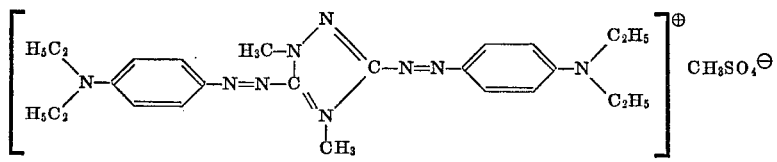

The salt dye provides a reddish-blue color in aqueous solutions and it dyes polyacrylonitrile type fibers from a weak acidic dye bath to bright reddish-blue shades which have excellent fastness to sunlight, washing, rubbing and heat, and which can be discolored by suitable discoloring treatments using stannous chloride. Where diethyl sulfuric acid or p-toluene sulfonic acid is used instead of the dimethyl sulfuric acid in this process, the ethylated dye corresponding to the salt dye is obtained. Where a zinc chloride solution is added to the sodium chloride solution in the salting out procedure, the complex salts of zinc chloride of the salt dye is obtained.

When using the following disazo dyes in a similar process as that stated above, similar salt dyes having similar properties are obtained. The colors described in the following table were produced on polyacrylonitrile type fibers dyed with each salt dye. The following table refers to compositions having the following structure:

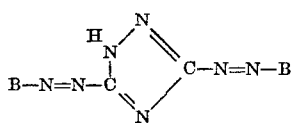

| Example | Disazo dye B= | Dye (parts) | Solvent (parts) | Quaternizing agent (parts) | Color |
|---|---|---|---|---|---|
| 2 | H₅C₂\N—⟨⟩—, Cl / H₅C₂ | 48.8 | Dimethyl-formamide (490) | Dimethyl sulfate (29) | Reddish-blue. |
| 3 | H₅C₂\N—⟨⟩—, NHCOCH₃ / H₅C₂ | 53.3 | Dimethyl-formamide (530) | Diethyl sulfate (37) | Blue. |
| 4 | (n)H₉C₄\N—⟨⟩— / (n)H₉C₄ | 54.7 | Dimethyl-formamide (540) | Methylbenzene sulfonate (42) | Do. |
| 5 | H₅C₂\N—⟨⟩— / CH₂—⟨⟩ | 54.3 | Do. | Dimethyl sulfate (29) | Reddish-blue. |

TABLE—Continued

| Example | Disazo dye B= | Dye (parts) | Solvent (parts) | Quaternizing agent (parts) | Color |
|---|---|---|---|---|---|
| 6 | NCH₄C₂ / N–C₆H₄– with CH₂–C₆H₅ | 59.3 | Dimethyl formamide (590) | Dimethyl sulfate (20) | Reddish-blue. |
| 7 | H₅C₂ / N–C₆H₄– with HOH₄C₂ | 47.9 | Dioxane (500) | methyl p-toluene sulfonate (46) | Blue. |
| 8 | NCH₄C₂ / N–C₆H₄– with NCH₄C₂ | 54.7 | Dioxane (550) | Benzyl chloride (30) | Reddish-blue. |
| 9 | H₃C / N–C₆H₄– with C₆H₅ | 48.7 | Dimethyl-formamide (490) | Methyl p-toluene sulfate (50) | Blue. |
| 10 | H₃C / N–naphthyl with H₃C | 46.3 | ...do... | Dimethyl sulfate (29) | Do. |
| 11 | H / N–C₆H₃(Cl)– with NCH₄C₂ | 48.2 | Dimethyl-formamide (460) | ...do... | Violet. |
| 12 | H₂C₂ / N–C₆H₅ with H₃COH₄C₂ | 47.9 | Dimethyl-formamide (480) | Diethyl sulfate (37) | Blue. |

EXAMPLE 13

A solution of 9.9 parts of guanazole in 99 parts of 60% acetic acid, is added dropwise to a mixture of 298 parts of nitrosyl sufuric acid and 14.7 parts of sodium nitrite at −5° to 0° C. while stirring. The mixture is stirred for 1 hour in the presence of an excess amount of nitrous acid to produce the tetrazo compound.

After removing the nitrous acid by addition of a small amount of urea, a solution of 33 parts of N-phenylmorphorine in 100 parts of glacial acetic acid, is added to the solution of tetrazonium salt of guanazole at 0° to 2° C. 220 parts of ammonium acetate is then added to the mixture over a period of 1 hour to cause coupling.

The coupling mixture is poured into 2,000 parts of ice water and then 226 parts of 48% aqueous solution of sodium hydroxide is added thereto.

The dark reddish-brown precipitate produced is filtered and dried at 70° C.

The disazo dyestuff having the following formula is obtained:

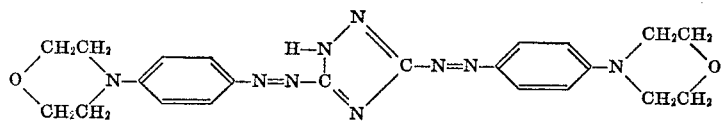

42 parts of said disazo dye is dissolved into 400 parts of dimethylformamide and then 27.2 parts of dimethyl sulfuric acid is added dropwise at a temperature of 60° C. The mixture is then stirred for 2 hours at 95° C. to effect quaternization.

The product thus obtained by quaternizing is poured into 1,500 parts of water and is filtered with 5 parts of active carbon.

300 parts of sodium chloride is added to the filtrate to effect salting out. The dark blue precipitate is filtered and dried at 70° C. and 54 parts of the quaternary ammonium salt dyestuff having the following formula is obtained:

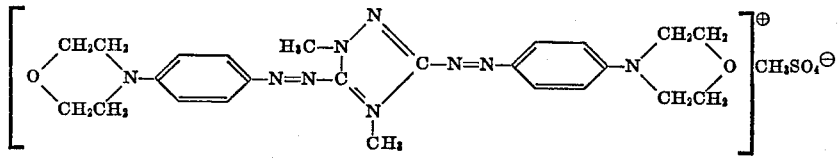

The salt dye provides a reddish-blue color in an aqueous solution and dyes polyacrylonitrile type fiber from a weak acidic dye bath, to bright reddish-blue shades which have excellent fastness to sunlight, washing, rubbing and heat, and which can be discolored by suitable discoloring treatment using stannous chloride.

Where diethyl sulfuric acid or p-toluene sulfonic acid ethylester is replaced for dimethyl sulfuric acid in the said process, the ethylated dye corresponding to said salt dye is obtained. Where zinc chloride solution is added to the sodium chloride solution in said salting out process, complex salts of zinc chloride of said salt dye are obtained.

When using the following disazo dyes in a similar process as that stated above, similar salt dyes having similar properties are obtained. The colors described in the following table were produced on polyacrylonitrile type fibers dyed with each salt dye. The following table refers to compositions having the following structure:

to the solution of tetrazonium salt of guanazole at a temperature of 0° to 2° C. 220 parts of ammonium acetate is added to the solution over a period of 1 hour to cause coupling.

The coupling mixture is poured into 2,000 parts of ice water and then 226 parts of 48% aqueous solution of sodium hydroxide is added thereto.

The dark reddish-brown precipitate produced is filtered and dried at 70° C.

The disazo dyestuff having the following formula is obtained:

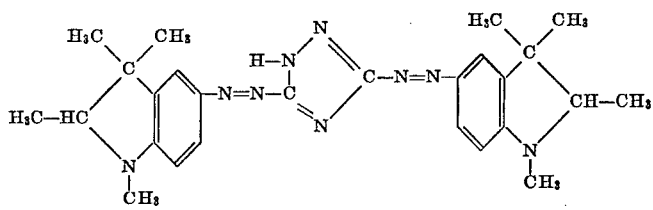

43 parts of said disazo dye is dissolved in 400 parts of dimethylformamide and then 25 parts of dimethyl sulfuric acid is added dropwise at 60° C. and the mixture is stirred for 2 hours at 95° C. to cause quaternization.

The product thus obtained by quaternizing is poured into 1,500 parts of water and is filtered with 5 parts of active carbon.

300 parts of sodium chloride is added to the filtrate to

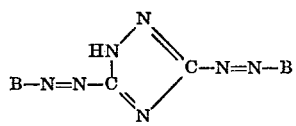

| Example | Disazo dye B= | Dye (parts) | Solvent (parts) | Quaternizing agent (parts) | Color |
|---|---|---|---|---|---|
| 14 | H₂CH₂C\HN/ \N-⟨⟩-/H₂CH₂C | 44.6 | Dimethylformamide (440) | Dimethyl sulfate (29) | Reddish-blue. |
| 15 | CH₂—CH₂\CH₂ N-⟨⟩-/CH₂—CH₂ | 44.4 | Dioxane (440) | do | Blue. |

EXAMPLE 16

A solution of 9.9 parts of guanazole in 99 parts of 60% acetic acid is added dropwise to a mixture of 298 parts of nitrosyl sulfuric acid and 14.7 parts of sodium nitrite at —5° to 0° C. while stirring. The mixture is stirred for 1 hour in the presence of an excess amount of nitrous acid, to produce the tetrazo compound.

After removing the nitrous acid by addition of a small amount of urea, a solution of 35 parts of 1,2,3,4-tetramethyl indoline in 80 parts of glacial acetic acid, is added effect salting out. The dark blue precipitate is filtered and dried at 70° C. and 56 parts of the quaternary ammonium salt dyestuff having the following formula is obtained:

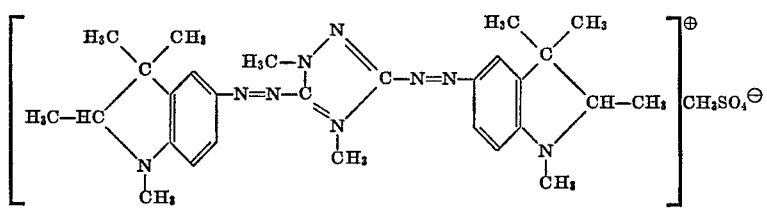

The salt dye provides a reddish-blue color in aqueous solution and it dyes polyacrylonitrile type fiber, from a weak acidic dye bath, to bright reddish-blue shades which have excellent fastness to sunlight, washing, rubbing and heat, and which can be discolored by suitable discoloring treatment using stannous chloride.

Where diethyl sulfuric acid is used instead of dimethyl sulfuric acid in said process, the ethylated dye corresponding to said salt dye is obtained. Where zinc chloride solution is added to the sodium chloride solution in said salting out process, complex salts of zinc chloride of said salt dye are obtained.

When using the following disazo dyes in a similar process as that stated above, similar salt dyes having similar properties are obtained. The colors described in the following table were produced on polyacrylonitrile type fibers dyed with each salt dye. The following table refers to compositions having the following structure:

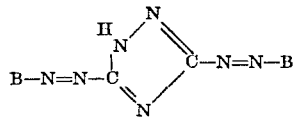

| Example | Disazo dye B = | Dye (parts) | Solvent (parts) | Quaternizing agent (parts) | Color |
|---|---|---|---|---|---|
| 17 | CH₃—CH(CH₂)—N(CH₃)—C₆H₄— | 41.5 | Dimethyl-formamide (400) | Diethyl sulfate (37) | Blue. |
| 18 | CH₂(CH₂)(CH₂)—N(CH₃)—C₆H₄— | 41.5 | Dioxane (400) | do | Do. |
| 19 | OH—CH(CH₂)(CH₂)—N(CH₃)—C₆H₄— | 47.7 | Dioxane (450) | Dimethyl sulfate (29) | Do. |
| 20 | OH—CH(CH₂)(CH₂)—N(C₄H₉(n))—C₆H₄— | 56.1 | Dimethyl-formamide (550) | Dimethyl sulfuric acid (29) | Do. |
| 21 | Cl—CH(CH₂)(CH₂)—N(CH₃)—C₆H₄— | 48.4 | Dimethyl-formamide (450) | do | Do. |
| 22 | H₃CO—CH(CH₂)(CH₂)—N(CH₃)—C₆H₄— | 50.5 | Dimethyl-formamide (500) | Ethyl p-toluene sulfonate (50) | Do. |
| 23 | CH₃—CH(CH₂)—N(C₂H₄Br)—C₆H₄— | 68.1 | Dimethyl-formamide (550) | p-Toluene sulfonic acid methyl ester (46) | Do. |
| 24 | CH₃—CH(CH₂)—N(CH₂C₆H₅)—C₆H₄— | 56.8 | Dimethyl-formamide (500) | Dimethyl sulfuric acid (29) | Do. |
| 25 | CH₃—CH(CH₂)—N(C₂H₄Cl)—C₆H₄— | 51.2 | Dimethyl-formamide (550) | do | Do. |

EXAMPLE 26

A solution of 9.9 parts of guanazole in 99 parts of 60% acetic acid is added dropwise to a mixture of 298 parts of nitrosyl sulfuric acid and 14.7 parts of sodium nitrite at −5° to 0° C. while stirring. The mixture is stirred for 1 hour in the presence of an excess amount of nitrous acid, to produce the tetrazo compound.

After removing the nitrous acid by addition of a small amount of urea, a solution of 32.6 parts of N,N-diethyl-m-toluidine in 100 parts of glacial acetic acid is added to the solution of tetrazonium salt of guanazole at 0° to 2° C. 220 parts of ammonium acetate is then added to the solution over a period of 1 hour to cause coupling.

The coupling mixture is poured into 2,000 parts of ice water and then 220 parts of 48% aqueous solution of sodium hydroxide is added thereto.

The dark reddish-brown precipitate produced is filtered and dried at 70° C.

The disazo dyestuff having the following formula is obtained:

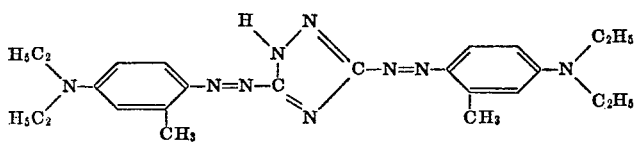

38 parts of said disazo dye is dissolved into 700 parts of benzene and then 25.2 parts of dimethyl sulfuric acid is added dropwise at 50° C. and the mixture is stirred for 2 hours at 75° to 80° C. to cause quaternization. The product thus obtained by quaternizing is poured into 1,500 parts of water and is filtered with 5 parts of active carbon.

300 parts of sodium chloride is added to the filtrate to effect salting out. The dark blue precipitate is filtered and dried at 70° C. and 40 parts of the quaternary ammonium salt dyestuff having the following formula is obtained:

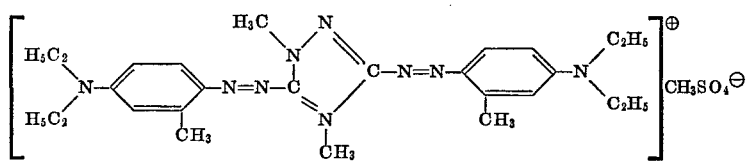

The salt dye provides a reddish-blue color in an aqueous solution and it dyes polyacrylonitrile type fiber, from a weak acidic dye bath, to bright reddish-blue shades which have excellent fastness to sunlight, washing, rubbing and heat, and which can be discolored by discoloring treatment using stannous chloride.

Where benzyl chloride is used instead of dimethyl sulfuric acid in said process, the benzylated dye corresponding to said salt dye is obtained. Where zinc chloride solution is added to the sodum chloride solution in said salting out process, complex salts of zinc chloride of said salt dye are obtained.

When using the following disazo dyes in a similar process as that stated above, similar salt dyes having similar properties are obtained. The colors described in the following table were produced on polyacrylonitrile type fibers dyed with each salt dye.

The following table refers to compositions having the following structure:

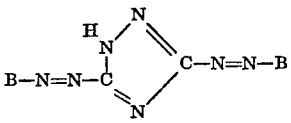

| Example | Disazo dye B= | Dye (parts) | Solvent (parts) | Quaternizing agent (parts) | Color |
|---|---|---|---|---|---|
| 27 | H₅C₂\N-⟨⟩-OCH₃ / H₅C₂ | 47.9 | Toluene (700) | Diethyl sulfate (37) | Reddish-blue. |
| 28 | H₃C\N-⟨⟩ / H₃C | 36.3 | Chlorobenzene (600) | Benzyl chloride (30) | Do. |
| 29 | ⟨⟩-CH₂\N-⟨⟩ / CH₂-⟨⟩ | 66.8 | Xylene (700) | Dimethyl sulfate (29) | Do. |

TABLE—Continued

| Example | Disazo dye B = | Dye (parts) | Solvent (parts) | Quaternizing agent (parts) | Color |
|---|---|---|---|---|---|
| 30 | 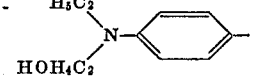 | 45.2 | Chloroform (600) | Benzene-sulfonate (42) | Blue. |
| 31 | 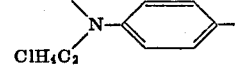 | 46.0 | Benzene (700) | Methyl p-toluene sulfonate (46) | Reddish-blue. |
| 32 | 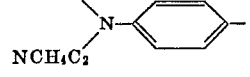 | 49.2 | Tetrachloroethane (800) | Dimethyl sulfonate (29) | Do. |
| 33 | 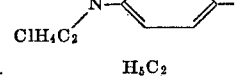 | 56.9 | Tetrachloromethane (700) | Ethyl p-toluene sulfonate (50) | Do. |
| 34 |  | 57.2 | Chlorobenzene (800) | Dimethyl sulfurate (29) | Blue. |
| 35 | 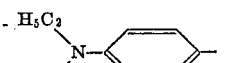 | 52.0 | o-Dichlorobenzene (700) | do | Do. |

Having fully described the invention, it will be apparent to one having ordinary skill in the art that many changes and modifications can be made to the invention without departing from the spirit or scope thereof.

Accordingly, what is claimed and desired to be secured by Letters Patent is:

1. A basic disazo compound having the formula selected from the group consisting of:

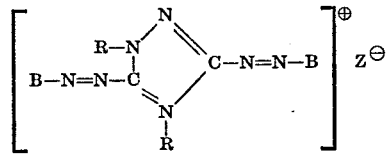

and

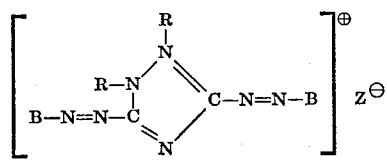

wherein R represents lower alkyl or benzyl; $Z^\ominus$ represents an anion; and B represents a member selected from the group consisting of:

wherein A is a member selected from the group consisting of phenylene, naphthylene, or phenylene or naphthylene substituted by substituents selected from the group consisting of lower alkyl, lower alkoxy, acetylamino and halogen; $R_1$ and $R_2$ each represent, respectively, a member selected from the group consisting of hydrogen, lower alkyl, beta-oxy lower alkyl, beta-cyano lower alkyl, beta-lower alkoxy lower alkyl, beta-halo lower alkyl, and benzyl, phenyl or lower alkoxy substituted phenyl, and wherein $R_1$ and $R_2$ taken together are bonded directly or linked with nitrogen or oxygen atoms to form a ring selected from the group consisting of piperidino, piperadino, and morpholino; and,

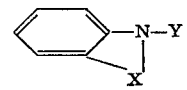

wherein X represents a divalent radical which forms a 5- or 6-member hetero ring linked with a nitrogen atom selected from the group consisting of lower alkylene, lower oxyalkylene, halo lower alkylene; and wherein Y represents a member selected from the group consisting of lower alkylene, halo lower alkyl, and phenyl lower alkyl radicals.

2. The basic disazo dye of claim 1 represented by:

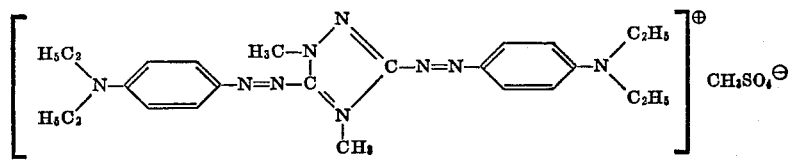

3. The basic diazo dye of claim 1 represented by:

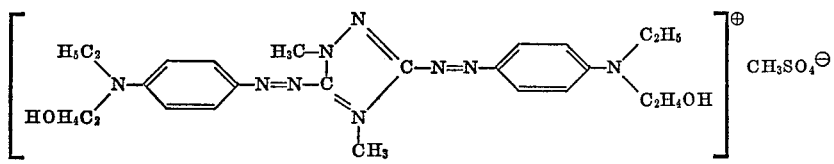

4. The basic disazo dye of claim 1 represented by:

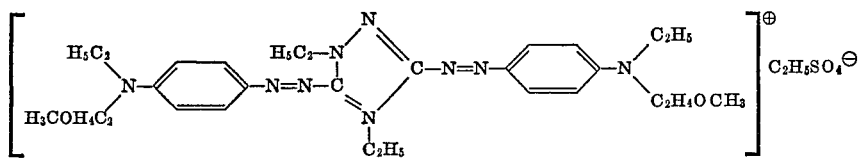

5. The basic disazo dye of claim 1 represented by:

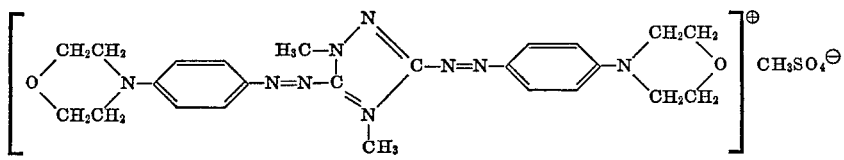

6. The basic disazo dye of claim 1 represented by:

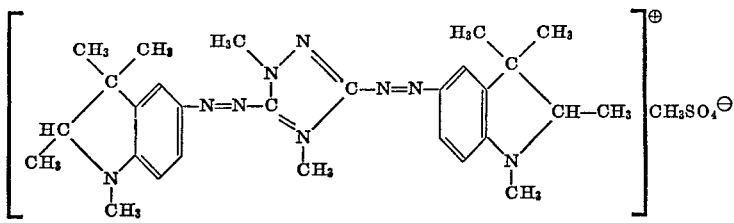

7. The basic disazo dye of claim 1 represented by:

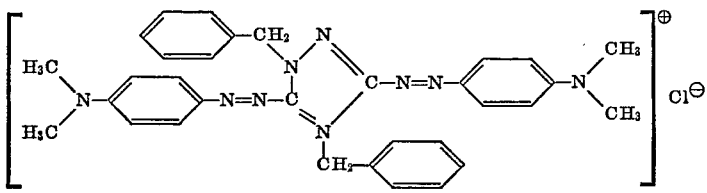

References Cited
UNITED STATES PATENTS

| | | | |
|---|---|---|---|
| 2,883,373 | 4/1959 | Bossard et al. | 260—157 X |
| 3,078,137 | 2/1963 | Baumann et al. | 260—157 X |
| 3,101,988 | 8/1963 | Bossard et al. | 260—157 |
| 3,148,935 | 9/1964 | Pfitzner et al. | 260—157 X |
| 3,438,963 | 4/1969 | Robbins | 260—157 |
| 3,291,788 | 12/1966 | Yamaya et al. | 260—157 |
| 3,360,508 | 12/1967 | Sureau et al. | 260—157 X |

FLOYD DALE HIGEL, Primary Examiner

U.S. Cl. X.R.

260—146 R, 156, 308 R